United States Patent [19]
Nomura et al.

[11] Patent Number: 6,132,206
[45] Date of Patent: Oct. 17, 2000

[54] WATER COOLED FINGER FOR PRE-HEATER OF FURNACE TOP

[75] Inventors: Tamotsu Nomura; Seiji Nonoyama, both of Aichi; Kunio Matsuo, Gifu, all of Japan

[73] Assignee: Daido Tokushuko Kabushiki Kaisha, Japan

[21] Appl. No.: 09/345,768

[22] Filed: Jul. 1, 1999

[30] Foreign Application Priority Data

Jul. 10, 1998 [JP] Japan .................................. 10-211973

[51] Int. Cl.$^7$ ....................................................... F27D 1/08
[52] U.S. Cl. ............................ 432/95; 432/162; 110/298; 266/175
[58] Field of Search .................................. 432/95, 96, 97, 432/98, 99, 100, 101, 102, 162; 110/297, 298, 299; 373/79, 80, 1; 266/175, 901, 190, 241, 40

[56] References Cited

U.S. PATENT DOCUMENTS

| | | | |
|---|---|---|---|
| 4,852,858 | 8/1989 | Weber | 266/175 |
| 5,513,835 | 5/1996 | Lonardi et al. | 266/176 |

FOREIGN PATENT DOCUMENTS

| | | |
|---|---|---|
| 0 475 009 A1 | 3/1992 | European Pat. Off. . |
| 885 244 | 8/1953 | Germany . |
| 08054191 | 2/1996 | Japan . |
| 08136163 | 5/1996 | Japan . |
| 09257377 | 10/1997 | Japan . |
| 10054674 | 2/1998 | Japan . |

Primary Examiner—Stephen Gravini
Assistant Examiner—Jiping Lu
Attorney, Agent, or Firm—Bacon & Thomas PLLC

[57] ABSTRACT

A water cooled finger for a pre-heater of a furnace top holds metal materials of a required amount in a shaft installed at the furnace top for pre-heating metal materials by introducing exhaust gas at high temperature generated in the furnace into the shaft. The water cooled finger is formed of a pair of side aces, an upper plate and a lower plate. The upper plate is fixed to an upper plate of both of the side face portions. The lower plate is fixed to a lower plate of both of the side face portions. The water cooled finger is formed to be hollow as a whole by the side face, the upper plate and the lower plate. The water cooled finger satisfies at least one of the conditions of (A) a thickness of the upper plate is thicker than that of said lower plate, (B) the lower plate is formed to be R-bending processed portions at both ends thereof, and(C) the lower plate is curved outside.

6 Claims, 4 Drawing Sheets

WATER COOLED FINGER FOR PRE-HEATER OF FURNACE TOP

BACKGROUND OF THE INVENTION

1. Field of the Invention

The present invention relates to a water cooled finger for a pre-heater of a furnace top. When metal scraps are melted in, for example, a melting furnace such as a burner furnace and an arc furnace, it is sometimes common to previously pre-heat metal scraps with exhaust gas of high temperature generated in the melting furnace.

2. Description of the Related Art

For pre-heating metal scraps, various kinds of apparatuses are used. Attention has recently been paid to such a pre-heating apparatus installed at the melting furnace top, which is provided with a shaft at the top of the melting furnace and holds metal scraps charged in the shaft by means of the water cooled finger so as to pre-heat them with the exhaust gas of high temperature issued from the melting furnace.

Conventionally, the water cooled finger of the pre-heater of the furnace top as mentioned above is generally formed as a whole to be hollow by welding steel plates (Unexamined Japanese Patent Publication (kokai) No.8-54191, No.8-136163 and No.9-257377). These fingers are constructed by welding upper plates and lower plates to both side plates. These fingers are formed as a whole to be hollow structures, and the outer configuration in cross section being square. Generally, the hollow part is partitioned, so that cooling water is caused to flow successively into each of the partitioned chambers. However, such a conventional finger is involved with problems about concurrent satisfactions of strength and durability against repetition of dropping impact of charged metal materials and characteristic durable against repetition thermal stress.

Since metal materials are thrown into the shaft through the upper inlet thereof, the finger holding thrown metal materials is repeatedly affected by considerable dropping impact of metal materials. Accordingly, the finger is required to have enough strength and durability against the repetition of dropping impacts. On the other hand, the finger holding thrown metal materials is heated outside by high temperature exhaust gas coming from the furnace, and is cooled inside by the cooling water running in the hollow part of the finger, so that thermal stress caused by heating and cooling acts thereon. Thus, the water cooled finger is also at the same time required to have durable characteristics against repeated thermal stress. However, if the water cooled finger were made of steel plates of relatively large thickness, since the lower plate of the finger exposed to high temperature exhaust gas is affected by considerable thermal stress, cracks would easily appear in the lower plate. Thermal stress is, in its nature, concentrated in welded parts between both side plates at both ends of the lower plate of the finger and the-lower plates thereof, so that cracks easily occur in particular at the welded parts. When cracks appear, the cooling water leaks there, repairs of the finger are frequently required, and affected portions should be exchanged in short periods of time. On the other hand, if he water cooled finger were made of steel plates of relatively mall thickness for satisfying characteristic against repeated thermal stress, since the upper plate thereof directly receiving thrown metal materials is affected by large dropping impact, the upper plate would be easily broken. Similarly in this case, repairs of the finger are also frequently required, and affected portions should be exchanged in short periods of time, after all. In the conventional water cooled finger, it is not possible to concurrently satisfy the need for durable strength against the repeated dropping impacts and the characteristic for durability against the repeated thermal stress.

SUMMARY OF THE INVENTION

It is an object of the present invention to provide a water cooled finger in a pre-heater at the furnace top capable of simultaneously satisfying the strength required to withstand the repeated dropping impacts of metal materials and the characteristic for durability against repeated thermal stress.

A water cooled finger for a pre-heater of a furnace top holds metal matlerials of a required amount in a shaft installed at the furnace top for pre-heating metal materials by introducing exhaust gas at high-temperature generated in the furnace into the shaft. The water cooled finger is formed of a pair of side faces, an upper plate and lower plate. The upper plate is fixed to an upper plate of both of side face portions. The lower plate is fixed to a lower plate of both of side face portions. The water cooled finger is formed to be hollow as a whole by the side face, the upper plate and the lower plate. The water cooled finger satisfies at least one of the conditions that (A) a thickness of the upper plate is thicker than that of said lower plate, (B) the lower plate is formed to be R-bending processed portions at both ends thereof, and(C) the lower plate is curved outside.

DETAILED DESCRIPTION OF THE INVENTION

Figure 1:
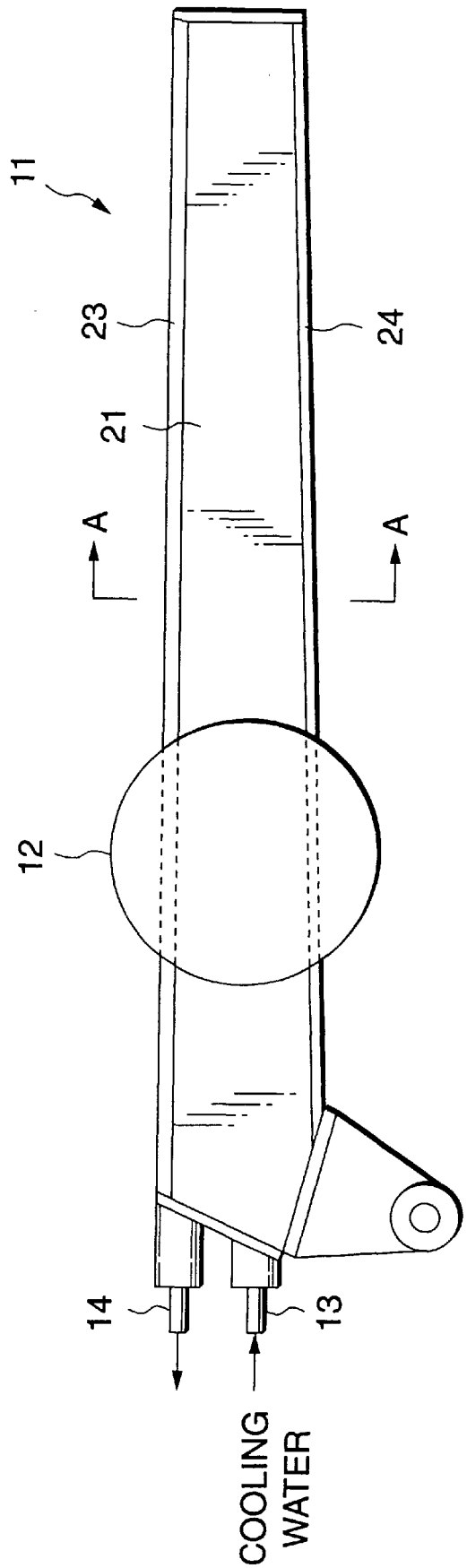
FIG. 1 is a side view of a first embodiment of a water cooled finger according to the present invention.

Detailed description of the present invention will be described as follows.

The present invention provides a water cooled finger for a pre-heater of a furnace top, for holding metal materials of a required amount in a shaft installed at the furnace top for pre-heating metal materials by introducing exhaust gas at high temperature generated in the furnace into the shaft. The water cooled finger is formed to be hollow as a whole.

The present invention satisfies at least one of the conditions:

(A) the thickness of the upper plate of the water cooled finger is relatively large, while the thickness of the lower plate thereof is relatively small;

(B) the lower plate of the water cooled finger is formed to be R-bending processed portions at both ends thereof; and (C) the lower plate of the water cooled finger is curved outside.

These conditions can be used alone. Alternatively, it is preferable to combine the condition (A) with the condition (B) or the condition (C).

The water cooled finger of the present invention is formed to be hollow as a whole by welding steel plates. With respect to the entire outer configuration thereof, an upper plate and a lower plate are welded to both side plates, and are formed in an arm shape by closing the front end part and the base part with other side plates, and normally the thus formed hollow part is partitioned. Consequently, the cooling water is caused to flow in succession into each of the partitioned chambers. Such a water cooled finger is provided with a central portion of rotation at the base part, and an inlet and an outlet of the cooling water in the base part outside of the shaft. The rotating central portion is provided in the shaft wall, so that the finger is opened and closed by rotating it around fulcrum of the rotating center. The water cooled finger receives and holds metal materials thrown into the shaft under the closing state, and pre-heats them with the high temperature exhaust gas from the furnace.

The water cooled finger according to the present invention is formed in that the upper plate thereof has relatively large thickness, while the lower plate thereof has relatively small thickness. A steel plate of relatively large thickness is used for forming the upper plate of the water cooled finger, and a steel plate of relatively small thickness is used for forming the lower plate of the same. The thickness of the lower plate is preferably not more than ½ of that of the upper plate, more preferably not more than ⅓. For example, when the upper plate forming the upper plate is around 40 mm in thickness, the steel plate of around 6 to 9 mm thickness is employed for the lower plate. The upper plate of the finger directly receives the dropping impact of metal materials thrown into the shaft. The lower plate of the finger is effected with large thermal stress generated outside by the heating of high temperature exhaust gas from the furnace as well as inside by the cooling of the cooling water running in the hollow part of the finger. If using the steel plate of larger thickness for the upper plate, it is given the strength durable to repeated dropping impact, and if using the lower steel plate of smaller thickness for the lower plate, the thermal stress is reduced, so that it is given the characteristic of durability against to repeated thermal stress.

For simultaneously giving the water cooled finger the strength of durability against repeated dropping impacts and the characteristic of durability against to the thermal stress, R-bending processed parts may be formed at both ends of the lower plate, instead of making the thickness of the lower plate smaller than that of the upper plate, or preferably in cooperation with the latter. The R-worked portion is performed at both sides of the lower steel plate forming the lower plate, preferably at both side of the steel plate of the smaller thickness so as to raise up both sides toward the side direction. Both raised parts are welded to the side steel plates forming side faces. As a result, the R-bending processed parts are formed at both ends of the lower plate. The water cooled finger is affected at the lower plate thereof with the thermal stress caused by the heating outside by the high temperature exhaust gas from the furnace and by the cooling inside by the cooling water. Such thermal stress is concentrated, in its nature, to both ends of the lower plate. If the steel plates forming both side faces at both ends thereof is welded to the steel plate of the lower plate, the welded parts are placed on both end parts of the lower plate. Accordingly, the thermal stress is concentrated there and causes cracks in the welded parts, but by forming the R-bending processed parts at both ends of the lower plate, occurrences of cracks can be avoided.

In order to give the same time the water cooled finger the durable strength against repeated dropping impacts and the characteristic of durability against repeated thermal stress, the lower plate may be curved outside, instead of making the thickness of the lower plate smaller than that of the upper surface, or preferably in cooperation therewith. The steel plate curved outside for forming the lower plate, preferably both ends of the curved steel plate of smaller thickness are welded to side plates as the side faces, resulting in forming the outside curve of the lower plate. The water cooled finger is affected at the lower plate thereof by the heating outside by the high temperature exhaust gas from the furnace and the thermal stress caused by the cooling inside by the cooling water running in the hollow part of the water cooled finger. Such thermal stress is concentrated, in its nature, to both ends of the lower plate. If the side steel plates for forming both side faces is welded to both ends of the lower steel plate for forming the lower plate, the welded parts are placed at both end parts of the lower plate. Accordingly, the thermal stress is concentrated there and causes cracks in this welded parts, but by forming the R-bending processed parts at both ends of the lower plate, occurrences of cracks can be avoided.

Preferred embodiments according to the present invention will be described as follows referring to the accompanying drawings.

Figure 2:
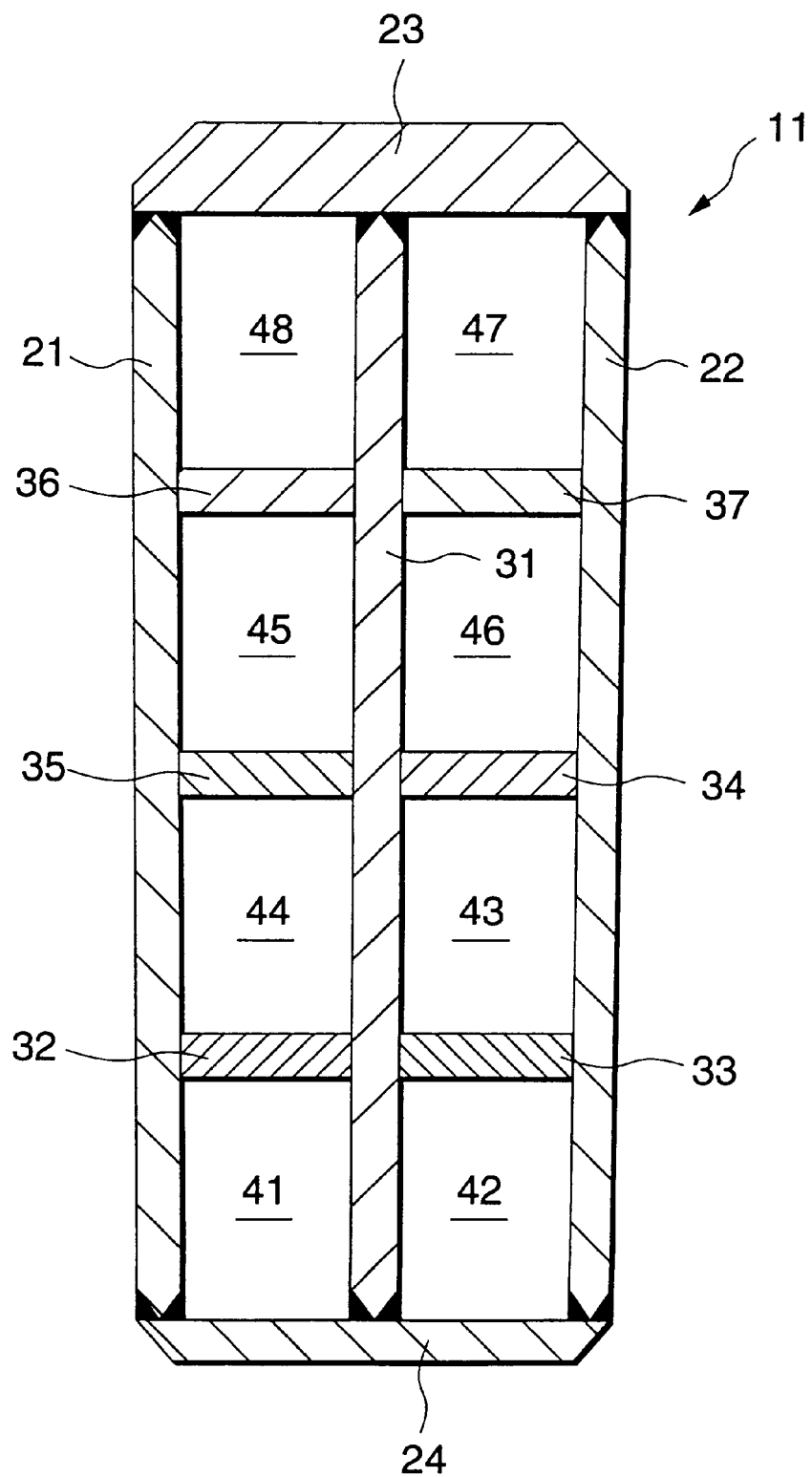
FIG. 2 is a cross sectional view seen along A—A line of FIG. 1.

FIG. 1 is a side view of a first embodiment of a water cooled finger according to the present invention. FIG. 2 is a cross sectional view seen along A—A line of FIG. 1 The water cooled finger 11 is formed to be a hollow structure as a whole by welding the steel plates together. With respect to an entire outer configuration, an upper plate 23 and a lower plate 24 are welded to both side plates 21, 22 and further formed in an arm shape by closing a front end part and a base part with other side plates. The formed hollow part is installed with the partitioning plates 31 to 37, and the cooling water is caused to successively flow into each of the partitioned chambers 41 to 48. The water cooled finger 11 is provided with a rotating central portion 12 in the base part and with an inlet 13 and an outlet 14 of the cooling water in the base part outside of the shaft. The rotating central portion 12 is provided in a shaft wall (not shown). Accordingly, the water cooled finger is opened and closed around a fulcrum of the rotating center portion 12. The water cooled finger receives and holds metal materials thrown into a shaft (not shown) under the closing state, and pre-heats metal materials with the high temperature exhaust gas from a furnace (not shown).

The water cooled finger 11 is formed in that the upper plate 23 thereof is of relatively large thickness, while the lower surface 24 thereof is of relatively small thickness. Namely, a steel plate of relatively large thickness is used for forming the upper plate 23 of the finger 11, and a steel plate of relatively small thickness is used for forming the lower plate 24. In the first embodiment shown in FIGS. 1 and 2, the thickness of the lower plate 24 is ⅓ or less than that of the upper plate 23. By using the steel plate of larger thickness as the upper plate for forming the upper plate 23, the water cooled finger is given the durable strength against repeated dropping impacts. By using the lower steel plate of smaller thickness for forming the lower plate 24, the thermal stress is reduced. Accordingly, the water cooled finger is given the characteristic durable to the repetition of the thermal stress.

Figure 3:
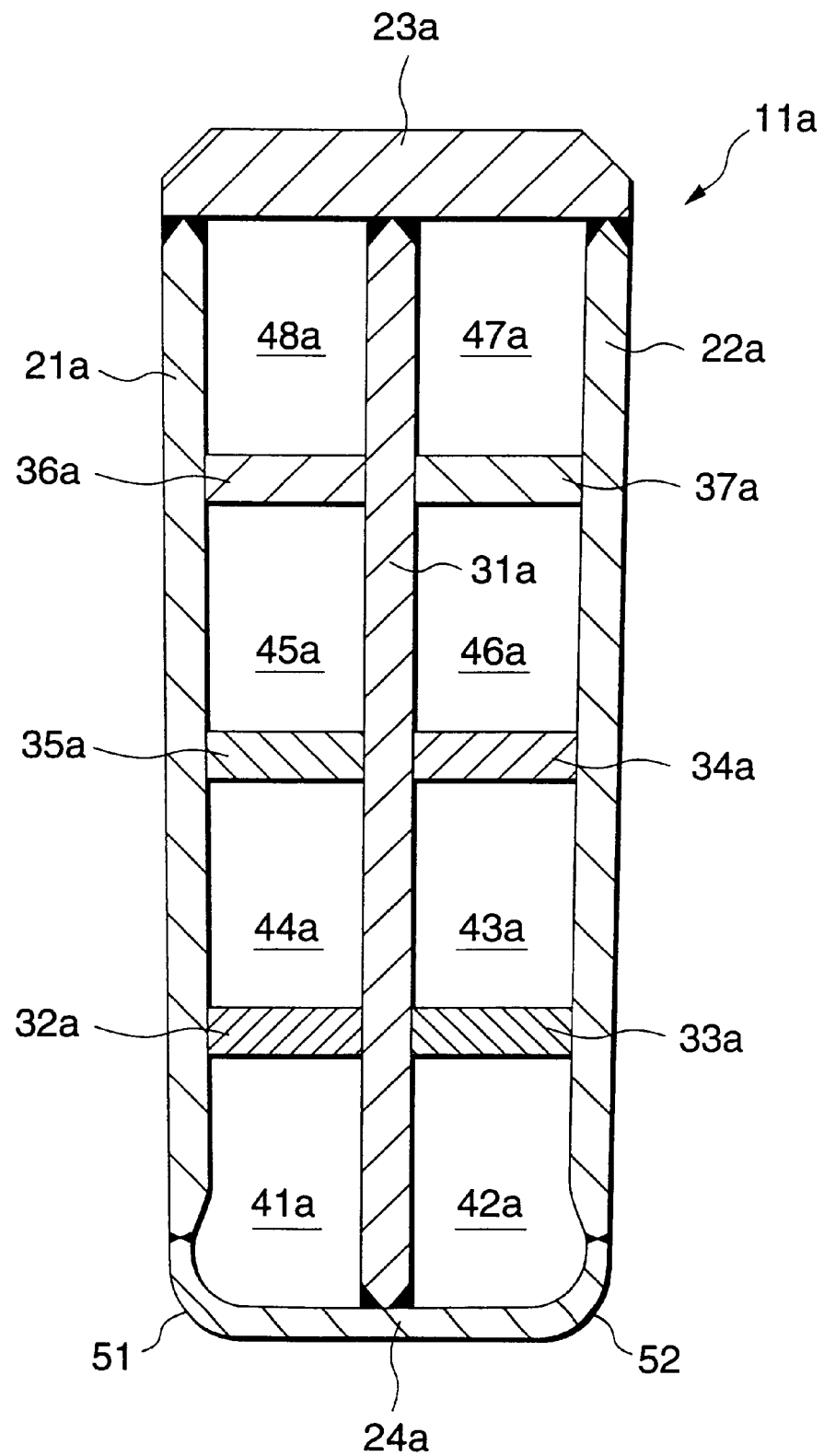
FIG. 3 is a cross sectional view of a second embodiment of the water cooled finger according to the present invention.

FIG. 3 is a cross sectional view of a second embodiment of a water cooled finger according to the present invention. The other structures not explained are identified with those of the water cooled finger shown in FIGS. 1 and 2. The water cooled finger 11a is formed in that the upper plate 23a thereof is of larger thickness, while the lower plate 24a thereof is of smaller thickness. Namely, a steel plate of larger thickness is employed for forming the upper plate 23a thereof, and a steel plate of smaller thickness is employed for forming the lower plate 24a. In the second embodiment shown in FIG. 3, the thickness of the lower plate 24a is ¼ or less than that of the upper plate 23a. The finger 11a is formed with R-bending processed portions 51, 52 at both end parts of the lower plate 24a. The R-bended portion is performed at both sides of the steel plate of smaller thickness forming the lower plate 24a so as to raise up both ends toward the side directions. Both raised portions are welded to the side steel plates forming side faces 21a, 22a, resulting in forming the R-bending processed portions 51, 52 at both ends of the lower plate 24a. By using the steel plate of larger thickness for the upper plate 23a, the water cooled finger is given the durable strength against repeated of dropping impacts. By using the steel plate of smaller thickness for the lower plate 24a, the thermal stress is reduced, and the same time the R-bending processed portions 51, 52 are formed at both ends of the face 24a to be concentrated with thermal stress. Accordingly, the water cooled finger it is given the characteristic of durability against repeated thermal stress.

Figure 4:
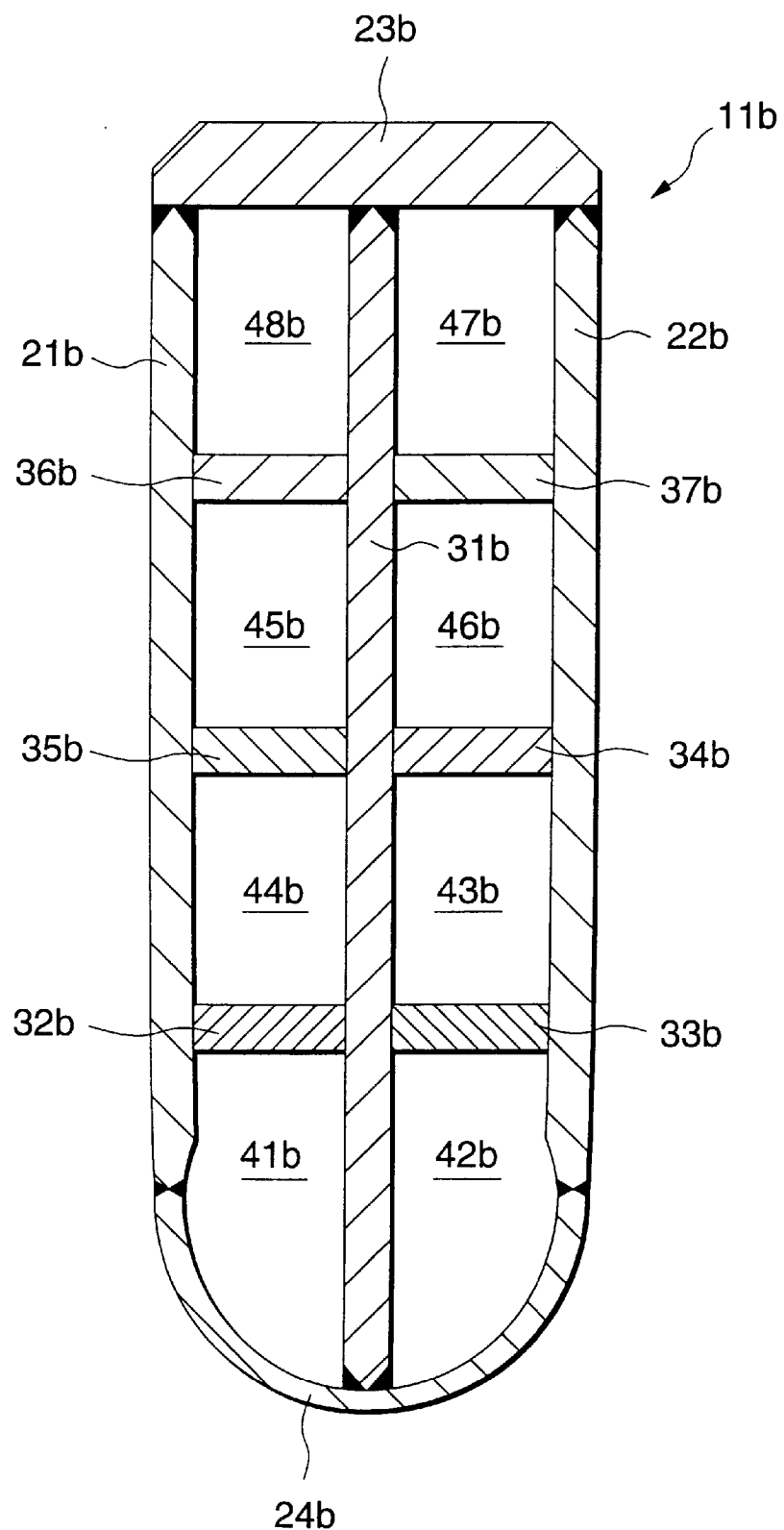
FIG. 4 is a cross sectional view of a third embodiment of a further water cooled finger according to the present invention.

FIG. 4 is a cross sectional view of a third embodiment of a water cooled finger according to the present invention. The other structures not explained are identified with those of the water cooled finger shown in FIGS. 1 and 2. The water cooled finger 11b is formed in that the upper plate 23b thereof is of relatively large thickness, while the lower plate 24b curved outside is of relatively small thickness. Namely, a steel plate of relatively large thickness is employed for forming the upper plate 23b thereof, while a steel plate of relatively small thickness curved outside is employed for forming a lower plate 24b. In the third embodiment shown in FIG. 4, the thickness of the steel plate forming the lower plate 24b is ¼ or less than that of the steel plate forming the upper plate 23a. Both end portions of the outside curved steel plate of smaller thickness forming the lower plate 24b are welded to side steel plates for forming side faces 21b, 22b, resulting in forming the outside curve of the lower plate 24b. By using the steel plate of larger thickness forming the upper plate 23b, the water cooled finger is given the strength durable to the repetition of dropping impact, while by using the steel plate of smaller thickness forming the lower plate 24b, the thermal stress is reduced, and at the same time it is dispersed, whereby the water cooled finger is given the characteristic of durability against repeated of the thermal stress.

The present invention as mentioned above is effective in simultaneously meeting durable strength required against the repeated dropping impacts of metal materials thrown on the water cooled finger, as well as the characteristic of durability against repeated thermal stress. The present invention is by no means restricted to the above-described preferred embodiments, but covers all variations that might be implemented by using equivalent functional elements or devices that would be apparent to a person skilled in the art, or modifications that fall within the spirit and scope of the appended claims.

What is claimed is:

1. A water cooled finger for a pre-heater of a furnace top, which holds metal materials of a required amount in a shaft installed at the furnace top for pre-heating metal materials by introducing exhaust gas at high temperature generated in the furnace into the shaft, comprising:

a pair of side face portions;

an upper plate portion fixed to an upper plate of both of said pair of side face portions;

a lower plate portion fixed to a lower plate of both of said pair of side face portions, said water cooled finger being formed to be hollow as a whole by said pair of side face portions, said upper plate portion and said lower plate portion;

said upper plate is thicker than that of said lower plate, and;

said water cooled finger satisfies at least one of the following conditions:

A) said lower plate is formed to include R-bending processed portions at both ends thereof, and B) said lower plate is curved outside.

2. The water cooled finger for a pre-heater of a furnace top according to claim 1, wherein said lower plate is formed to include the R-bending processed portions at both of the ends thereof.

3. The water cooled finger for a pre-heater of a furnace top according to claim 1, wherein said lower plate is curved outside.

4. The water cooled finger for a pre-heater of a furnace top according to claim 1, wherein the thickness of the lower plate portion is not more than ½ of that of the upper plate portion.

5. The water cooled finger for a pre-heater of a furnace top according to claim 4, wherein the thickness of the lower plate portion is not more than ⅓ of that of the upper plate portion.

6. The water cooled finger for a pre-heater of a furnace top according to claim 6, wherein the thickness of the lower plate portion is not more than ¼ of that of the upper plate portion.

* * * * *